(12) United States Patent
Hedges et al.

(10) Patent No.: US 11,932,404 B2
(45) Date of Patent: Mar. 19, 2024

(54) OBOGS CONTROLLER

(71) Applicant: Honeywell International Inc., Charlotte, NC (US)

(72) Inventors: Peter James Hedges, Dorset (GB); Andrew Paul Marsh, Yeovil (GB)

(73) Assignee: Honeywell International Inc., Charlotte, NC (US)

( * ) Notice: Subject to any disclaimer, the term of this patent is extended or adjusted under 35 U.S.C. 154(b) by 365 days.

(21) Appl. No.: 17/161,228

(22) Filed: Jan. 28, 2021

(65) Prior Publication Data

US 2022/0063818 A1    Mar. 3, 2022

(30) Foreign Application Priority Data

Aug. 28, 2020    (GB) ..................................... 2013603

(51) Int. Cl.
*B64D 13/04*    (2006.01)
*B64D 13/06*    (2006.01)

(52) U.S. Cl.
CPC ............. *B64D 13/04* (2013.01); *B64D 13/06* (2013.01); *B64D 2013/0603* (2013.01)

(58) Field of Classification Search
CPC .. A62B 7/14; B64D 2013/0681; B64D 13/00; B64D 2013/0677; B64D 13/04; B64D 13/06; B64D 2013/0603; B64D 2231/02; B01D 2253/108; B01D 2256/12
See application file for complete search history.

(56) References Cited

U.S. PATENT DOCUMENTS

| | | | |
|---|---|---|---|
| 4,919,124 A | | 4/1990 | Stevenson et al. |
| 4,927,434 A | * | 5/1990 | Cordes .............. B01D 53/0454 96/417 |
| 5,004,485 A | | 4/1991 | Hamlin et al. |

(Continued)

FOREIGN PATENT DOCUMENTS

| | | |
|---|---|---|
| EP | 1393795 A2 | 3/2004 |
| EP | 1441812 B1 | 8/2004 |

(Continued)

OTHER PUBLICATIONS

Lee Payne, Know when to use open- or closed-loop control, Aug. 17, 2017, Control Engineering https://www.controleng.com/articles/know-when-to-use-open-or-closed-loop-control/ (Year: 2017).*

(Continued)

*Primary Examiner* — Edelmira Bosques
*Assistant Examiner* — Michael James Giordano
(74) *Attorney, Agent, or Firm* — Shumaker & Sieffert, P.A.

(57) ABSTRACT

This disclosure describes an on-board oxygen generating system (OBOGS) using open loop control. An example OBOGS includes a concentrator comprising at least two beds and a controller. Each bed has a valve to pneumatically couple the bed between a supply gas source and a vent; The controller receives at least one input signal from at least one sensor aboard an aircraft, and determines a predicted oxygen concentration output from the at least two beds into the based on the received input signals. The controller controls the valves of the at least two beds based on the determined predicted oxygen concentration to adjust charge/vent ratios of the at least two beds.

16 Claims, 5 Drawing Sheets

(56) References Cited

U.S. PATENT DOCUMENTS

| | | |
|---|---|---|
| 5,199,423 A | 4/1993 | Harral et al. |
| 5,590,852 A | 1/1997 | Olson |
| 5,858,063 A | 1/1999 | Cao et al. |
| 6,063,169 A | 5/2000 | Cramer et al. |
| 6,712,876 B2 | 3/2004 | Cao et al. |
| 6,789,539 B2 | 9/2004 | Martinez |
| 6,997,970 B2 | 2/2006 | Crome |
| 7,264,647 B2 | 9/2007 | Meckes et al. |
| 7,574,894 B2 | 8/2009 | Austerlitz et al. |
| 7,694,674 B2 | 4/2010 | Crome et al. |
| 7,981,193 B2 | 7/2011 | Hedges |
| 8,015,973 B2 | 9/2011 | Geary |
| 8,171,932 B2 | 5/2012 | Rittner et al. |
| 8,424,525 B2 | 4/2013 | Peacey et al. |
| 8,795,041 B2 | 8/2014 | Saito et al. |
| 9,089,721 B1 | 7/2015 | Horstman et al. |
| 2004/0245390 A1 | 12/2004 | Meckes et al. |
| 2006/0243859 A1 | 11/2006 | Lessi et al. |
| 2006/0266357 A1 | 11/2006 | McCombs et al. |
| 2007/0214954 A1* | 9/2007 | Hedges ............ B64D 13/00 95/8 |
| 2008/0090510 A1* | 4/2008 | Scherer ............ B64D 37/32 454/71 |
| 2009/0145428 A1 | 6/2009 | Sward et al. |
| 2011/0000490 A1 | 1/2011 | Gillotin et al. |
| 2012/0160244 A1* | 6/2012 | Sharma HK ........ A61M 16/12 128/204.23 |
| 2013/0081627 A1 | 4/2013 | Bailey et al. |
| 2014/0366875 A1 | 12/2014 | Motlagh |
| 2017/0001047 A1 | 1/2017 | Bricard et al. |

FOREIGN PATENT DOCUMENTS

| | | |
|---|---|---|
| EP | 1834877 A2 | 9/2007 |
| FR | 2880328 A1 | 7/2006 |

OTHER PUBLICATIONS

Response to Extended Search Report dated Jan. 5, 2022, from counterpart European Application No. 21190913.0 filed Feb. 23, 2022, 29 pp.

Department of Defense Design Criteria Standard, "Aircraft Crew Breathing Systems Using On-Board Oxygen Generating System (OBOGS)" (MIL-STD-3050 promulgated May 11, 2015, 30 pp.

"Environmental Control and Life Support Systems," by Honeywell International Inc., 2020, 2 pp. accessed from https://aerospace.honeywell.com/en/learn/products/space/environmental-control-and-life-support-systems, accessed on Aug. 26, 2020.

Extended Search Report from counterpart European Application No. 21190913.0 dated Jan. 5, 2022, 13 pp.

Communication pursuant to Article 94(3) EPC from counterpart European Application No. 21190913.0 dated Jul. 31, 2023, 4 pp.

Response to Communication pursuant to Article 94(3) EPC dated Jul. 31, 2023, from counterpart European Application No. 21190913.0, filed Oct. 9, 2023, 42 pp.

* cited by examiner

OBOGS CONTROLLER

This application claims priority to GB Application No. 2013603.2 filed Aug. 28, 2020, the entire content of which is incorporated herein by reference.

TECHNICAL FIELD

The disclosure generally relates to controllers for Onboard Oxygen Generating Systems (OBOGS).

BACKGROUND

Modern military aircraft employ On-Board Oxygen Generating System (OBOGS) units instead of with liquid oxygen tanks to provide oxygen to crew members. OBOGS units may separate nitrogen from an air supply to provide an oxygen enriched product gas. Generally, OBOGS units may use pressure swing adsorption (PSA) technology that operates multiple beds in charge phases (e.g., pressurizes, etc.) and vent phases. For example, one bed may be in the charge phase while another bed may be in the vent phase. Concentrators include canisters (sometimes referred to as "beds") that contain an adsorption material (such as, Zeolite, etc.) to which nitrogen sticks under pressure. During each charging phase, air from an air supply (e.g., bled from the compressor of an engine) is used to pressurize at least one of the beds (e.g., while at least one bed is venting). During this phase, the adsorption material adsorbs some or all of the nitrogen from the air supply creating an oxygen-enriched product gas. The product gas is fed to a regulator to be provided to crew members. During the vent phase, the now nitrogen-enriched waste gas within the concentrator is vented to, for example, an exhaust port into atmosphere.

SUMMARY

An on-board oxygen generating system (OBOGS) controller controls the concentrators to produce a product gas with a target oxygen concentration that based on the cabin altitude of the aircraft. Techniques described below use open loop control to determine (e.g., on a substantially continuous basis) the performance of oxygen concentrators based on environmental factors measured by various sensors.

An on-board oxygen generating system includes a concentrator comprising at least two beds and a controller. Each bed has a valve to pneumatically couple the bed between a supply gas source and a vent; The controller receives at least one input signal from at least one sensor aboard an aircraft, and determines a predicted oxygen concentration output from the at least two beds the based on the received input signals. The controller controls the valves of the at least two beds based on the determined predicted oxygen concentration to adjust charge/vent ratios of the at least two beds.

An example method to control an on-board oxygen generating system includes receiving input signals from sensors aboard an aircraft and determining a predicted oxygen concentration output from a concentrator comprising at least two beds based on the received input signals, each of the at least two beds having a valve to pneumatically couple the bed between a supply gas source and a vent. The method also includes controlling the valves of the at least two beds based on the determined predicted oxygen concentration to adjust charge/vent ratios of the at least two beds.

An example controller for an on-board oxygen generating system includes a valve control circuit and control circuitry. The valve control circuit operates valves of multiple beds. Each of the valves pneumatically couple the corresponding bed between a supply gas source and a vent. The control circuitry receives at least one input signal from at least one sensor aboard an aircraft, and determines a predicted oxygen concentration output from the at least two beds into the based on the received input signals. Additionally, the control circuitry controls, via the valve control circuitry, the valves of the beds based on the determined predicted oxygen concentration to adjust charge/vent ratios of the beds.

The details of one or more examples are set forth in the accompanying drawings and the description below. Other features, objects, and advantages will be apparent from the description and drawings, and from the claims.

DETAILED DESCRIPTION

Figure 1:
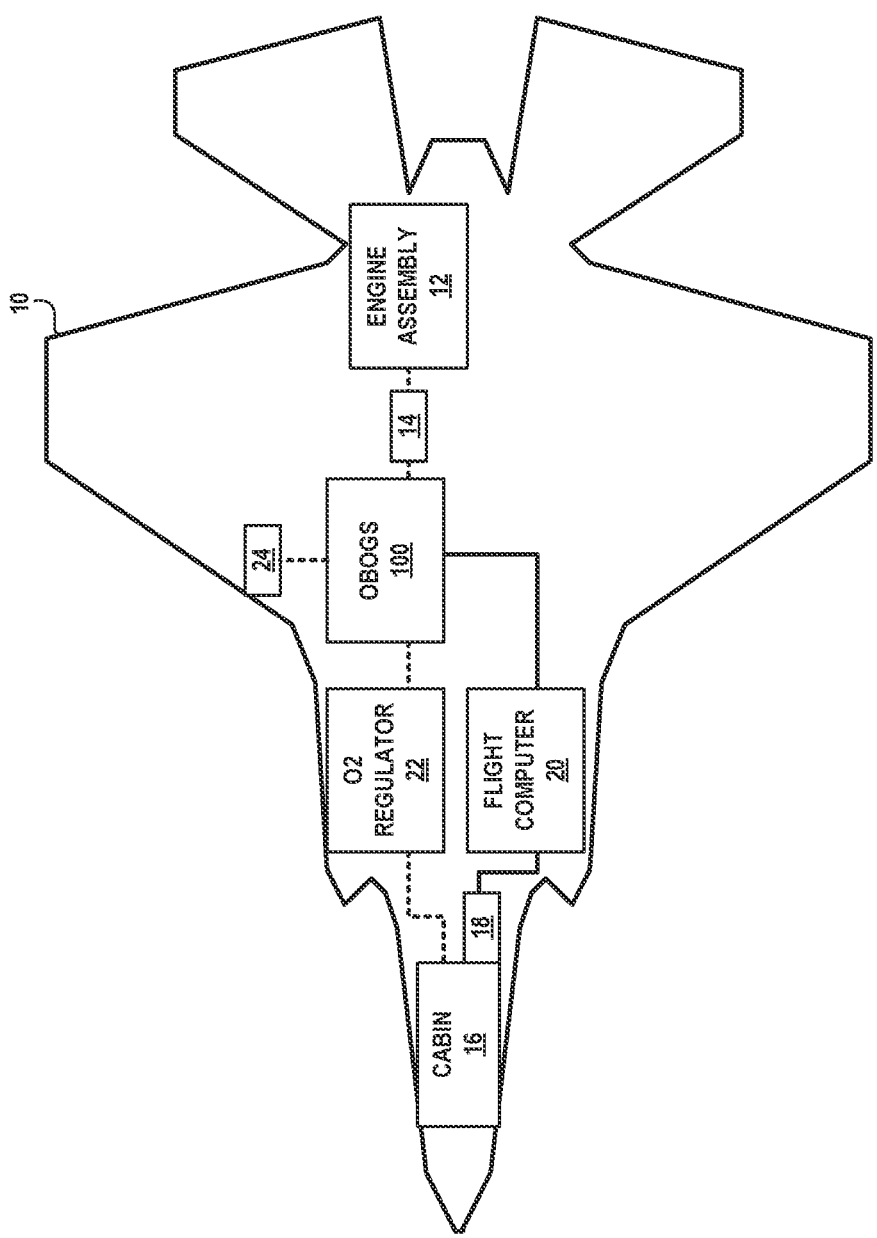
FIG. 1 illustrates an example aircraft with an On-Board Oxygen Generation System (OBOGS) operating in accordance with techniques described in this disclosure.

An On-Board Oxygen Generating System (OBOGS) may include oxygen concentrators that separate air into a product gas and a waste gas and an OBOGS controller to electrically and pneumatically control the oxygen concentrators. An OBOGS controller controls the concentrators to produce the product gas with a target oxygen concentration that based on the cabin altitude of the aircraft to be delivered to the crew of the aircraft. Target oxygen concentrations are often expressed as a range of percentage oxygen in the product gas to be provided at the current cabin altitude of the aircraft. The oxygen concentration of the product gas may depend on performance of the concentrators and is based on several environmental factors. To achieve the target oxygen concentration, the OBOGS controller may control the charge/vent cycle (sometimes referred to as "Charge/Vent") of the concentrators. The target oxygen concentration may be specified by an operating standard, such as Department of Defense Design Criteria Standard, entitled "Aircraft Crew Breathing Systems Using On-Board Oxygen Generating System (OBOGS)" (MIL-STD-3050 promulgated May 11, 2015). Such an operating standard may specify, e.g., that at a cabin altitude of 8,000 feet, the OBOGS unit supplies a product gas that is 30% to 60% oxygen.

Over time, these requirements to control oxygen concentration at defined cabin altitudes have become tighter and tighter, making it increasingly difficult to control the oxygen concentrator using conventional techniques. In some instances, OBOGs controllers may use closed loop control based on measurements of an oxygen sensor to determine the percent oxygen in the product gas. However, because oxygen concentration measurement from an oxygen sensor is a lagging indicator, such a closed loop control approach may be slow to react to changing conditions in which the OBOGS unit operates.

As described below, the OBOGS controller uses an open loop control technique to determine (e.g., substantially continuously) the performance of the concentrators based on environmental factors measured by various sensors. Open loop control proactively controls the concentrators by determining predicted performance based on current input instead of solely relying on a feedback signal. The OBOGS controller determines the performance of the concentrators based on input of environmental conditions measured by sensor. In some examples, the OBOGS controller uses a map-based open loop control to determine the performance of the concentrators. Rather than controlling the charge/vent cycle of the concentrators based a measurement of the oxygen concentration output from the concentrators, an OBOGS controller receives one or more input signals from sensors that measure the environmental conditions in which the OBOGS unit is operating to determine the oxygen concentration under those conditions. In some examples, the OBOGS controller receiving measurements of (1) an input pressure of the input gas into the concentrators, (2) a vent pressure (e.g., based on aircraft altitude), (3) a cabin pressure (sometimes referred to as "cabin altitude"), (4) an supply gas temperature, and/or (5) product flow rate. Based on the determined performance of the concentrators, the OBOGS controller controls the charge/vent cycle and, in some examples, regenerative purge flow control, of the concentrator to generate a target oxygen concentration in the product gas.

In some examples, the OBOGS controller uses (a) a map-based open loop control and, in some examples, (b) a feedback signal from an oxygen sensors (e.g., to ensure the control point is reached and to allow for changes in performance with respect to time. etc.). OBOGS controllers that uses map-based open loop control controls the charge/vent cycle and, in some examples, regenerative purge flow control, of the concentrator based on a set of input parameters that are known to affect the concentrators performance before changes in the output oxygen concentration can be detected. For example, when the determined oxygen concentration is with the current charge/vent cycle is (a) within the target oxygen concentration, the OBOGS controller may maintain the current charge/vent ratio, (b) under the target oxygen concentration, the OBOGS controller may decrease the current charge time, and (c) over the target oxygen concentration, the OBOGS controller may increase the current charge time and/or vary purge flow of the product gas. In some examples, the output of the open loop map may be signals to control the charge time and vent time of the concentrators to achieve the target oxygen concentration. Thus, instead of relying on a lagging indicator, the OBOGS controller can react to currently changes operating condition to provide more dynamic control of the oxygen concentration of the product gas.

FIG. 1 illustrates an example aircraft 10 (e.g., a military aircraft, a civilian aircraft, etc.) with an On-Board Oxygen Generation System (OBOGS) 100 operating in accordance with techniques described in this disclosure. In the illustrated example, OBOGS 100 receives compressed air from, for example, a compressor in an engine assembly 12. The compressed air passes through an air preparation unit 14 that preconditions the air for use by OBOGS 100. For example, air preparation unit 14 may include an air filter to filter particulates from the compressed air, a heat exchanger to low the temperature of the compressed air into an operating range (e.g., less than 93 degrees Celsius, etc.), a water separator to remove moisture from the compressed air, and/or a pressure regulator to control the pressure of the compressed air into OBOGS 100. In some examples, air preparation unit 14 is part of the pneumatic assembly of OBOGS 100.

As described below, in some examples, OBOGS 100 receives the compressed air as an input and produces oxygen enriched gas. OBOGS 100 produces the oxygen enriched gas based on a threshold range of percent oxygen based on a cabin altitude of an aircraft cabin 16 using open loop control. A controller of OBOGS 100 uses open loop control to determine the performance of oxygen concentrator(s) based on measurements from various sensors of factors that affect the performance of the oxygen concentrators.

To perform open loop control, OBOGS 100 uses sensors that are part of the OBOGS electrical and pneumatic assemblies and/or are available to OBOGS 100 via a data bus from other components in the aircraft. For example, OBOGS 100 may use cabin altitude measurements taken by a cabin pressure sensor 18 received via a flight computer 20. OBOGS 100 uses the cabin altitude measurement to determine the oxygen concentration setpoint and, in some examples, as part of the open loop control of the oxygen concentrator. The oxygen enriched gas flows to an oxygen regulator 22 to, for example, provide oxygen to a crew member at an appropriate pressure. For example, the oxygen enriched gas may be provided to masks of the crew. Waste gas (e.g., nitrogen enriched gas) is vented through vent port 24 to atmosphere.

Figure 2:
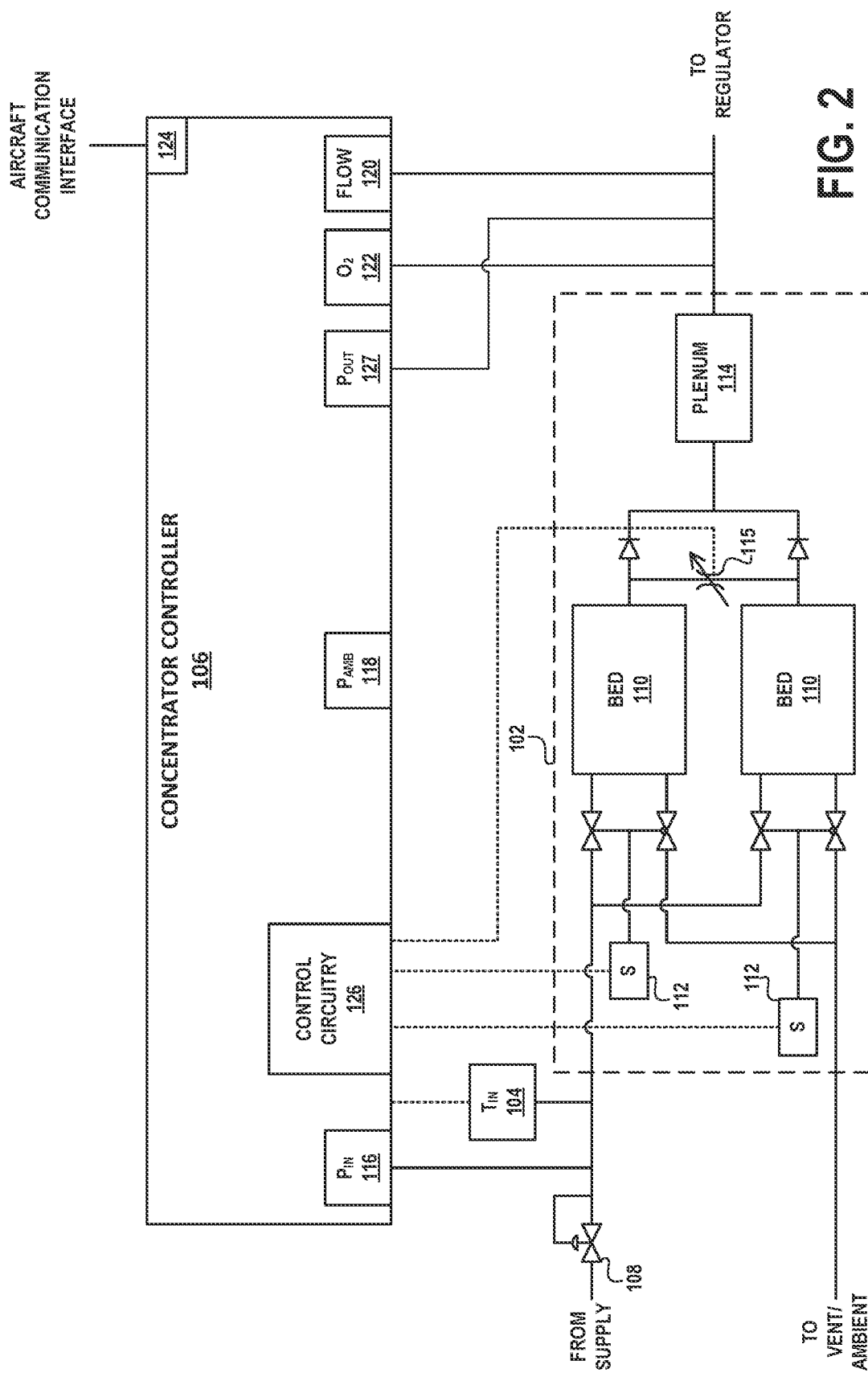
FIG. 2 is a block diagram of an OBOGS operating in accordance with techniques described in this disclosure.

FIG. 2 is a block diagram of OBOGS 100 operating in accordance with example techniques described in this disclosure. OBOGS 100 uses pressure swing absorption to separate nitrogen from conditioned, pressurized supply air to produce an oxygen-enriched product gas. OBOGS 100 may be installed on an aircraft, such as aircraft 10, and receive pressurized supply air from a compressor or exhaust of a turbine engine, such as engine assembly 12. The supply air may pass through a particle filter, a water separator, and a heat exchanger to condition it for nitrogen separation. The particle filter, water separator, and heat exchange may be part of OBOGS 100 or may be a separate apparatus pneumatically upstream from OBOGS 100.

In the illustrated example, OBOGS 100 includes an oxygen concentrator assembly 102, a temperature sensor 104, and a concentrator controller 106 (sometimes referred to as an "OBOGS controller"). In the illustrated example, OBOGS 100 also includes an emergency shut off or over pressure valve 108 to block the supply air under hazardous conditions.

Oxygen concentrator assembly 102 separates nitrogen from the supply air based on control signals from concentrator controller 104. In the illustrated example, oxygen concentrator assembly 102 includes multiple concentrator beds 110, solenoid valves 112, and a plenum 114. In some examples, concentrator assembly 102 includes a purge flow control valve 115. Concentrator beds 110 contain an adsorptive material, such as Zeolite, that absorbs nitrogen while under pressure. Concentrator beds 110 are alternately pressurized (sometimes referred to as "charged") and vented. During the charge cycle, the adsorptive material absorbs nitrogen leaving an oxygen-enriched gas to be output from concentrator beds 110. During the vent cycle, concentrator bed 110 is depressurized to release and purge the nitrogen. This nitrogen-enriched gas is vented to, for example, atmosphere. The efficiency of this process (e.g., the amount of nitrogen that may be removed) is based on the environmental conditions in which the concentrator beds 110 operate. Changing a charge/vent cycle (e.g., the amount of time the concentrator bed 110 is charged vs. the amount of time the concentrator bed is vented, etc.) may change the oxygen concentration of the product gas to meet target oxygen concentration level based on the cabin altitude of the aircraft. In the illustrated example of FIG. 1, oxygen concentrator assembly 102 includes two concentrator beds 110. However, oxygen concentrator assembly 102 may include more than two concentrator beds 110 (e.g., three concentrator beds 110, four concentrator beds 110, etc.).

Purge flow control ("PCF") valve 115 facilitates a variable amount of product gas from one bed to another bed when the other bed is venting. The oxygen in the product gas may facilitate rejuvenation of the adsorption material (e.g., decrease the time for the adsorption material to release the nitrogen to be purged) and may variably increase the flow of product gas produced by the charged bed. Increasing the flow reduces the oxygen concentration of the product gas. This may be used to supplement control of the vent/charge cycle to control the concentration of oxygen in the product gas. Because purge flow control valve 115 is variable (e.g., the amount the valve opens is controllable, etc.), control circuitry 126 may control the purge flow control valve 115 to supplement control of the vent/charge cycle.

Solenoid valves 112 pneumatically connect concentrator beds 110 to the air supply and the vent. Each solenoid valve 112 is a two- or three-way valve that pneumatically connects a corresponding concentrator bed 110 to the air supply when concentrator bed 110 is being charged and pneumatically connects the corresponding concentrator bed 110 to the vent when concentrator bed 110 is being vented. Generally, concentrator controller 106 controls solenoids 112 such that at least one concentrator bed 110 is charging and at least one concentrator bed 110 is venting at a given point in time. Solenoid valves 112 may be any suitable valve that is capable of alternately connecting concentrator beds 110 to the air supply and the vent (such as, a pneumatically driven slide valve, etc.).

Because the charge/vent cycles of produces an uneven flow of the product gas, plenum 114 equalizes the pressure of the product gas before the product gas is provided to an oxygen regulator (e.g., oxygen regulator 22 of FIG. 1, etc.) to supply the product gas to crew members of the aircraft. In some examples, the product gas may also cool in plenum 114. Plenum 114 is pneumatically coupled to concentrator beds 110 is one-way valves (e.g., check valves, etc.).

Temperature sensor 104 measures an input temperature (TIN) of the supply air.

Temperature sensor 104 may be, for example, a thermistor probe within pneumatic conduit between the air supply and solenoid valves 112.

Concentrator controller 106 controls the timing of the vent/charge cycles of concentrator beds 110 via solenoids 112. In some examples, concentrator controller 106 may control the charge/vent cycle to control the oxygen concentration of the product gas according to an oxygen set point schedule. The oxygen set point schedule defines a setpoint for the oxygen concentration of the product gas for the operating cabin altitudes of the aircraft with a peak flow rate (e.g., 1.5 liters per second). The set point may be a value (e.g., a midpoint, etc.) between a minimum oxygen concentration and a maximum oxygen concentration. Example oxygen set points are set forth on Table 1 below.

TABLE 1

| Cabin Altitude (feet) | Minimum Oxygen (%) | Maximum Oxygen (%) | Setpoint (%) |
|---|---|---|---|
| 5,000 | 25 | 60 | 43 |
| 10,000 | 31 | 60 | 46 |
| 15,000 | 38 | 60 | 49 |
| 20,000 | 51 | 100 | 76 |
| 25,000 | 61 | 100 | 81 |

Concentrator controller 106 controls the charge/vent cycle to maintain the oxygen concentration of the product gas to meet these thresholds. In the illustrated example, concentrator controller 106 includes an inlet pressure sensor 116, ambient pressure sensor 118, a flow meter 120, an oxygen sensor 122, an aircraft interface 124, and control circuitry 126. In some examples, concentrator controller 106 may also include an outlet pressure sensor 127 to measure the pressure of the product gas. The pressure sensors (e.g., inlet pressure sensor 116 and ambient pressure sensor 118, etc.) may be sampled at rate of at least once every 10 ms and a flow meter 120 and temperature sensor 104 are sampled may be sampled at a rate of at least once every 100 ms. These sampling rates may, for example, facilitate filtering to, for example, reduce noise.

The pressure of supply air (sometimes referred to as "inlet pressure" or "PIN") may affect the efficiency of the nitrogen adsorption process. Inlet pressure may vary, for example, from about 10 pounds per square in gauge (psig) to about 40 psig. However, in some examples, Inlet pressure may be measured in terms of absolute pressure (e.g., pounds per square in absolute (psia), etc.) Inlet pressure sensor 116 measures the inlet pressure. Ambient pressure of the atmosphere (sometimes referred to as "PAMB" or "vent pressure") around OBOGS 100 may also affect the efficiency of the nitrogen absorption process. Ambient pressure sensor 118 measures the ambient pressure of the atmosphere around OBOGS 100. For example, ambient pressure may range from 14.7 psia (e.g., at sea level) to 0.81 psia (e.g., at 65,000 ft.). In some examples, pressure sensors are industrial grade surface mounted devices. The flow rate of the product gas between plenum 114 and the oxygen regulator may affect the efficiency of the nitrogen absorption process. Flow meter 120 measures the flowrate of the product gas. In some examples, flow meter 120 is a thermal mass flow type sensor. In some examples, product gas flow may range from 5 to 100 liters per min cabin. Oxygen sensor 122 measure the oxygen concentration of the product gas. In some examples, oxygen sensor 122 measures a percent oxygen in the product gas. Percent oxygen may range from 20% oxygen to 99% oxygen.

Aircraft interface 124 communicates with a flight computer (e.g., flight computer 20 of FIG. 1) and/or other instrumentation of the aircraft via a data bus (e.g., a controller area network (CAN) data bus to, for example, provide status information to the aircraft regarding the operation of OBOGS 100. In the illustrated example, concentrator controller 106 receives a measurement of cabin pressure (sometimes referred to as "PCAB") via the aircraft interface 124. The cabin pressure is used, for example, to determine the upper and lower thresholds of the oxygen set point for OBOGS 100.

Control circuitry 126 controls concentrator 102 to react to changing environmental conditions to maintain a required oxygen concentration in the product gas. Aircraft flight may generally be divided into, for examples, two flight profiles: (i) a steady profile where the aircraft maintains an altitude, such as a cruising altitude, and (ii) a transition profile where the aircraft is ascending or descending. In a steady profile, environmental conditions are relatively steady (e.g., changes are generally gradual, etc.). In the transition profile, environmental conditionals are changing relatively quickly. Control circuitry 126 receives the measurements from inlet pressure sensor 116, ambient pressure sensor 118, flow meter 120, oxygen sensor 122, aircraft interface 124 and output control signal for solenoids 112 to control the charge/vent ratios of bed 110 in response to changing environmental conditions. Control circuitry 126 may include one or two control circuits (sometimes referred to as a "slow feedback control circuitry" and a "fast forward control circuit").

As described below, the first control circuit (e.g., the fast control circuit) determines a current performance of the concentrator 102 based on the environmental conditions (e.g., one or more of the inlet pressure, the ambient pressure, the flow rate, the input temperature, the cabin altitude, etc.) measured by the sensors and controls concentrator 102 based on the determination. In some examples, control circuitry 126 includes a multi-dimensional map that produces control signals for solenoids 112 based on a multi-dimensional mapping of the inputs (e.g., the sensor data) to performance of concentrator 102 over that operational range of those inputs (e.g., as define by the relevant standards, etc.). In some examples, control circuitry 126 includes a 5-dimensional map that maps the inlet pressure, the ambient pressure, the flow rate, the input temperature, and the cabin pressure over the operational range of the aircraft to the charge/vent cycle of the concentrator 102 that produce different oxygen concentrations in the product gas.

As described below, the second control circuit (e.g., the slow control circuit) uses a proportional-integral control circuit to provide a correction factor to the first control circuit by comparing an adjusted oxygen concentration setpoint to the oxygen concentration of the product gas as measured by oxygen sensor 122. The correction factor may change over time between maintenance events because, for example, performance of beds 110 may degrade over time due to moisture coming in contact with the absorption material. In some examples, the feedback error between predicted oxygen output of concentrator 102 and the actual oxygen output of concentrator 102 may be used to provide prognostic health performance of concentrator 102. An error above a threshold may be an indication of substantial degradation of concentrator 102 and may generate an alert indicative that concentrator 102 requires maintenance.

Control circuitry 126 may include one or more processors that are configured to implement functionality and/or process instructions for execution within concentrator controller 126. Control circuitry 126 may be implemented by any suitable processing device or set of circuitry such as, but not limited to: a microprocessor, a microcontroller-based platform, one or more field programmable gate arrays (FPGAs), one or more application-specific integrated circuits (ASICs), equivalent discrete or integrated logic circuitry, or a combination of any of the foregoing devices or circuitry. Accordingly, control circuitry 126 may include any suitable structure, whether in hardware, software, firmware, or any combination thereof, to perform the functions ascribed herein to processing circuitry 102.

A memory (not illustrated in FIG. 2) may be configured to store information within concentrator controller 106 during operation. The memory may include a computer-readable storage medium or computer-readable storage device. In some examples, the memory includes one or more of a short-term memory or a long-term memory. The memory may include, for example, random access memories (RAM), dynamic random-access memories (DRAM), static random-access memories (SRAM), magnetic discs, optical discs, flash memories, or forms of electrically programmable memories (EPROM) or electrically erasable and programmable memories (EEPROM). In some examples, the memory is used to store program instructions for execution by control circuitry 126.

Control circuitry 126 may be implemented by any suitable processing device or set of circuitry such as, but not limited to: a microprocessor, a microcontroller-based platform, a specifically designed integrated circuit, one or more field programmable gate arrays (FPGAs), and/or one or more application-specific integrated circuits (ASICs). Control circuitry 126 may also include one or more memory circuits using non-volatile memory (such as, magnetoresistive random-access memory (MRAM), erasable programmable read-only memory (EEPROM), flash memory, etc.) to store the multi-dimensional lookup map.

Figure 3:
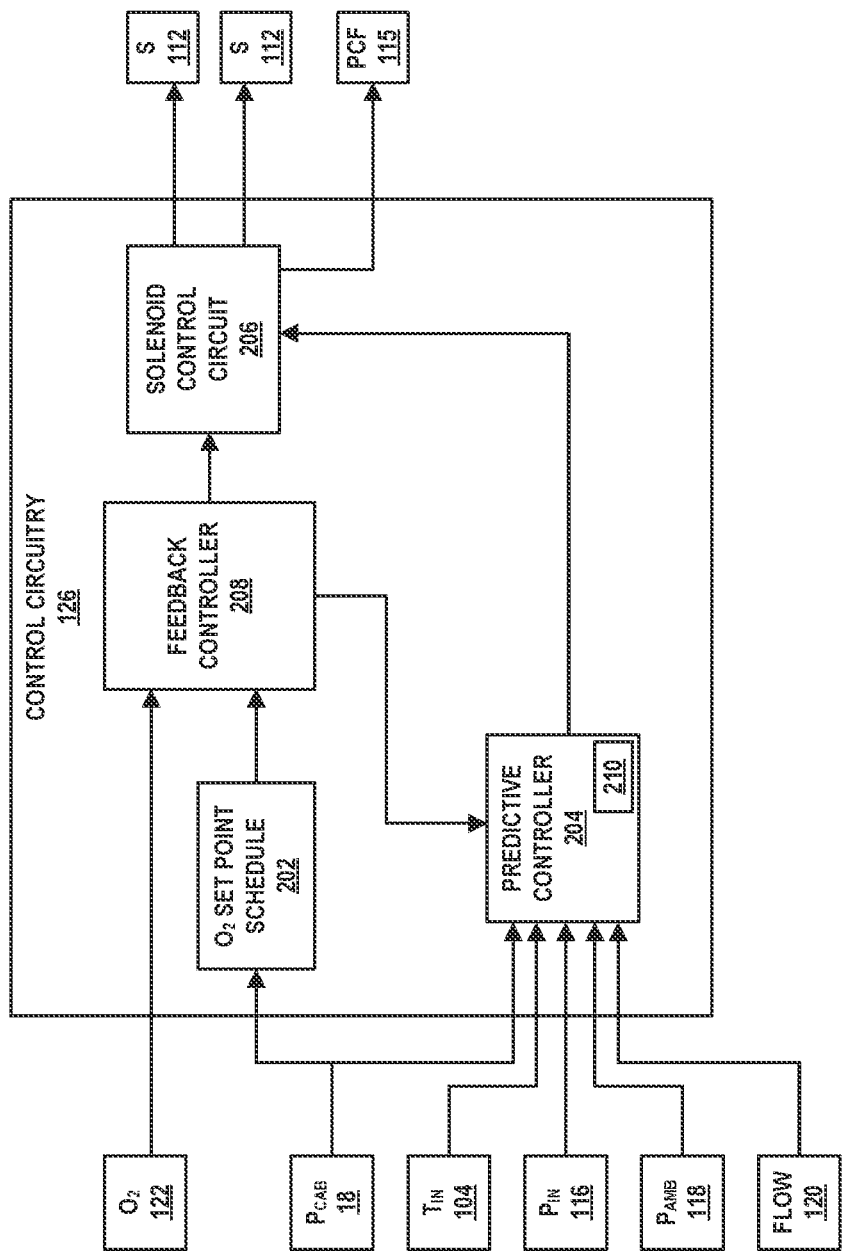
FIG. 3 is a block diagram of a controller for the OBOGS of FIGS. 1 and 2 operating in accordance with techniques described in this disclosure.

FIG. 3 is a block diagram of control circuitry 126 operating in accordance with example techniques described in this disclosure. Control circuitry 126 uses open loop control to control the charge/vent cycle of solenoids 112. In the illustrated example, control circuitry 126 supplements the open loop control with feedback control based on measurements from oxygen sensor 122. In the illustrated example, control circuitry 126 includes an oxygen set point schedule 202, a predictive controller 204, a solenoid control circuit 206, and a feedback controller 208.

Oxygen set point schedule 202 provides a threshold range of oxygen concentration of the output of OBOGS 100 based on cabin altitude provided by cabin pressure senor 18. Oxygen set point schedule 202 may be based on an aviation oxygen concentration standards, such as MIL-STD-3050.

In the illustrated example, predictive controller 204 provides one or more control signals to solenoid control circuit 206 based on an open loop control algorithm that determines the output of the beds 110 based on current environmental conditions. In some examples, predictive controller 204 includes a multi-dimensional map 210. Multi-dimensional map may, for example, be a three-dimensional map, a four-dimensional map, a five-dimensional map, etc. that maps variations in environmental conditions measured by various sensors to one or more control signals. Multi-dimensional map 210 is established for inputs from the sensors across the expected range of the measured environmental factors to determine the performance of beds 110 (e.g., the ability of the absorptive material to absorb nitrogen in the supply gas, etc.) to determines whether beds 110 require a longer or shorter charge time to produce a product gas with the oxygen concentration specified by oxygen set point schedule 202. Multi-dimensional map 210 outputs the control signal based on, for example, cabin altitude measured by cabin altitude sensor 18, input air temperature measured by temperature sensor 104, input air pressure measured by inlet pressure sensor 116, ambient atmospheric pressure measured by ambient pressure sensor 118, and/or flow rate of the product gas measured by flow meter 120, etc. In some examples, multi-dimensional map 210 (e.g., a six-dimensional map, etc.) may use a value derived from sensor measurements, such as and ascent/decent rate of aircraft 10 (e.g., derived from measurements by ambient pressure sensor 118, etc.)

In some examples, multi-dimensional map 210 may detect values from sensor measurements that are out of an expected input range (e.g., the measurements are a result of a failing sensor, etc.). In such examples, multi-dimensional map 210 may exclude that sensor from control or may include a default value for the out-of-bound sensor measurement. In some such examples, multi-dimensional map 210 may set a target oxygen concentration floor (e.g., a minimum of 21% oxygen) when one of the sensors is producing an out-of-bounds value. In some examples, when one or more sensor measurements are out-of-bounds, concentrator controller may disable control by predictive controller 204 and may cede control of solenoid control circuit 206 to feedback controller 208 until aircraft 10 receives maintenance.

Multi-dimensional map 210 may be generated by measuring the performance of beds 110 such that the output of multi-dimensional map 210 reflects the current performance of OBOGS 100 bases on current environmental conditions instead of relying on a lagging indicator of performance, such as measuring oxygen concentration with an oxygen sensor. For example, the performance of the beds 110 may be measured over the expected range of the input of the sensors. In some examples, multi-dimensional map 210 is generated using a sequence of steady conditions and letting the slow closed loop identify the control point. The charge/vent cycle is then saved to the map location that correspond to the steady state condition. In some example, a number of calibration points may be used to calibrate via the slow closed loop and intermediate values may be determined using a polynomial fit of the calibration points. The number of calibration points and values may depend on the sensitivity for each input parameter. Use of these open loop techniques improves performance OBOGS 100 by, for example, being more responsive and accurate during periods of rapid change in environmental conditions (such as, ascent and decent of aircraft 10, etc.).

In the illustrated example, control circuitry 126 also includes feedback controller 208. Feedback controller 208 performs feedback control (e.g., proportional and integral (PI) control, etc.) based on measurements of oxygen concentration in the product gas provided by oxygen sensor 112. Feedback controller 208 provides error correction to provide a correction signal to predictive controller 204. For example, as beds 110 operate over time, their performance may degrade. For example, over time, moisture not removed by air preparation unit 14 may cause the adsorptive material in beds 110 to adsorb less nitrogen. Feedback controller 208 provides an error correction signal based on the differences between the actual oxygen concentration (measured by oxygen sensor 122), the determined oxygen concentration (provided by predictive controller 204), and/or the oxygen concentration set point (provided by oxygen set point schedule 202). In some examples, predictive controller 204 may store the error correction and/or adjust the multi-dimensional map 210 based on the error correction such that a subsequent determination based on the particular inputs may be adjusted. In some such examples, the error correction signal may be used by predictive controller 204 to create multi-dimensional table 210.

Solenoid control circuit 206 receives the control signal from predictive controller 204 to control solenoids 112 to change the charge/vent cycle of beds 110 and/or, vary a flow of product gas via purge control flow valve 115. The control signal from predictive controller 204 controls solenoids 112 to change the amount of time the corresponding bed is pressurized/charged vs the amount of time the corresponding be is venting. In general, a longer charge time increases the nitrogen absorption of the adsorptive material to produce a product gas with a higher oxygen concentration. The time required is dependent on the efficiency of the absorptive material in beds 110 absorb nitrogen given the current environmental conditions (e.g. as determined by predictive controller 204). Thus, for example, when the oxygen concentration is to increase because of the oxygen setpoint or the ability of the absorptive material to adsorb nitrogen decreases because of the environmental conditions, the control signal may cause solenoids 112 to increase the amount of time the corresponding bed is charging and/or change a rate of product gas flow via purge control flow valve 115. In some examples, solenoid control circuit 206 also receives an error correction signal from feedback controller 204. Changing the charge/vent cycle changes the oxygen concentration to be within the threshold set by oxygen set point schedule 202.

Figure 4:
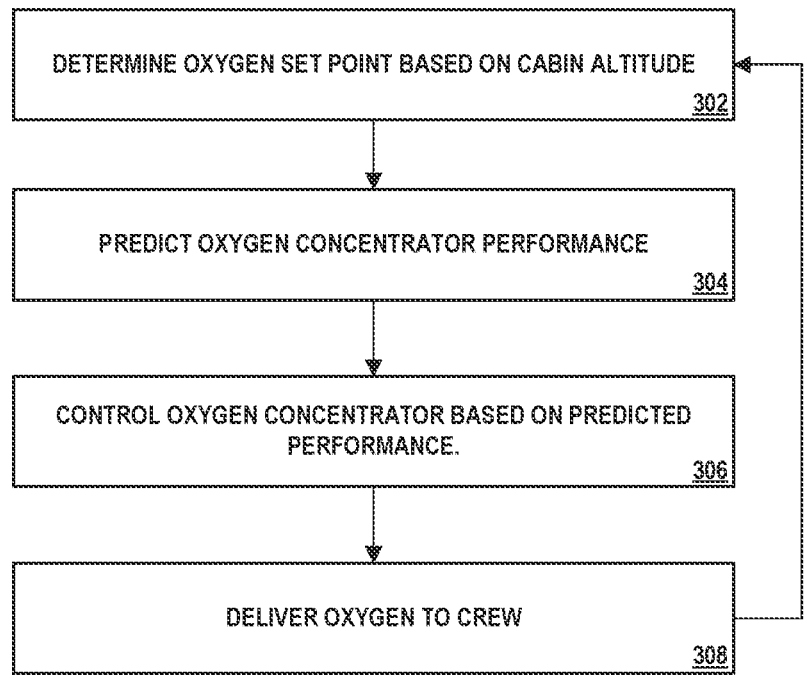
FIG. 4 is a flowchart of a method to control the OBOGS of FIGS. 1-3, in accordance with the techniques described in this disclosure.

FIG. 4 is a flowchart of a method to control OBOGS 100 of FIGS. 1-3, in accordance with the techniques described in this disclosure. For ease of description, the example technique of FIG. 4 is described with regard to the OBOGS 100 of FIGS. 1-3 although such an example technique may be employed in any suitable OBOGS system configured to supply oxygen to a cabin of an aircraft.

Initially, concentrator controller 126 determines an oxygen set point based on cabin altitude (302). For example, concentrator controller 126 use oxygen set point schedule 202 to determine an oxygen set point or range or oxygen set points. As such an example, at a cabin altitude of 15,000 feet, oxygen set point schedule 202 may determine the oxygen set points to be between 38 and 60 percent oxygen. The oxygen set point(s) define a concentration of oxygen in a product gas to be produced by OBOGS 100.

Concentrator controller 126 determines the performance of the oxygen concentrator 102 based on, for example, sensor measurements of environmental conditions which the OBOGS 100 is operating (304). For example, concentrator controller 126 may use a multi-dimensional map that maps multiple sensor measurements to a control signal to operation solenoids 110 to provide a charge/vent cycle that will achieve the oxygen set point. Based on the determined performance, concentrator controller 126 controls the charge/vent cycle of solenoids 112 to achieve the target set point. Based on the control signal from the concentrator controller 126, concentrator 102 produces a product gas within the oxygen set points to deliver to crew of aircraft 10 (e.g., via oxygen regulator 22) (308).

Figure 5:
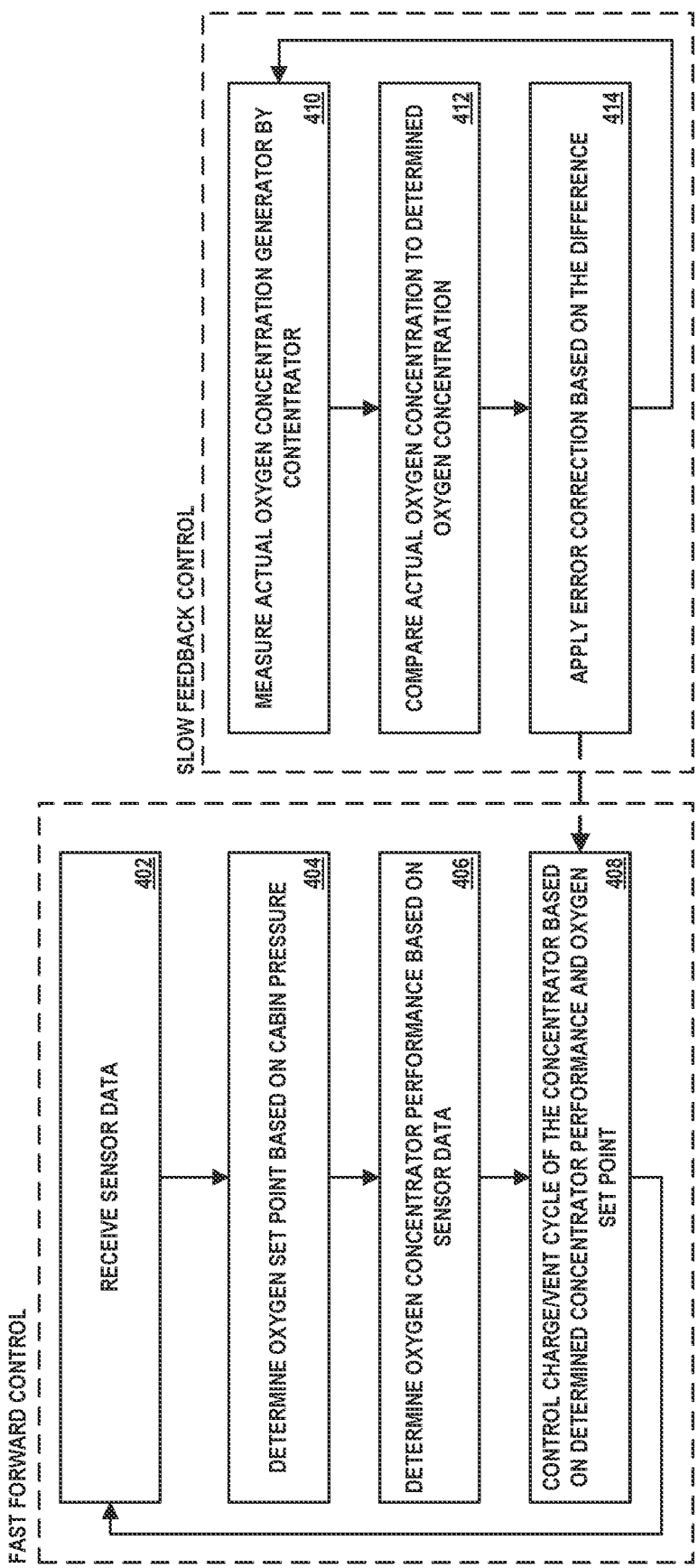
FIG. 5 is a flowchart of a method to control the oxygen concentrator to produce product gas with a target oxygen concentration, in accordance with the techniques described in this disclosure.

FIG. 5 is a flowchart of a method to control oxygen concentrator 102 to produce product gas with a target oxygen concentration, in accordance with the techniques described in this disclosure. For ease of description, the example technique of FIG. 5 is described with regard to the OBOGS 100 of FIGS. 1-3 although such an example technique may be employed in any suitable OBOGS system configured to supply oxygen to a cabin of an aircraft.

Initially, concentrator controller 126 receives sensor data from one or more sensors measuring environmental conditions in which OBOGS 100 operates (402). For example, concentrator controller 126 may receive the cabin altitude of cabin 16 measured by cabin pressure sensor 18, input temperature of the supply air measured by temperature sensor 104, input air pressure of the supply air measured by inlet pressure sensor 116, ambient atmospheric pressure measured by ambient pressure sensor 118, and/or flow rate of the product gas measured by flow meter 120. Oxygen concentrator 102 determines an oxygen set point and/or a range of oxygen set points (404). For example, oxygen set point schedule 202 may output an oxygen set point and/or a range of oxygen set points based on the cabin altitude of cabin 16. Predictive controller 204 of concentrator controller 126 determines the performance of oxygen concentrator 102 (406). In some examples, predictive controller 204 determines the performance using multi-dimensional map 210 based on the sensor measurements received at 402 and generates a control signal to control the charge/vent cycle solenoids 112 to cause the concentrator 102 to produce product gas with an oxygen concentration that satisfies the oxygen set point(s). Solenoid control circuitry 206 of concentrator controller 126 uses the control signal to control solenoids 112 (408). Concentrator controller 126 then continues the fast forward control cycle (402).

In a parallel manner, concentrator controller 126, via oxygen sensor 112, measure an actual oxygen concentration in the product gas (410). Feedback controller 208 of concentrator controller 126 compares the actual oxygen concentration to the determined oxygen concentration (412). The error correction is generated by feedback controller 208 to account for the different between the performance of oxygen concentrator 102 (e.g., as determined by predictive controller 204) and the actual performance of oxygen concentrator 102 (e.g., as measured by oxygen sensor 122). The actual oxygen concentration may account for a lag between controlling concentrators 102 and measuring the oxygen concentration in the resultant product gas (e.g., a 5-10 second delay, etc.). Feedback controller 208 applies an error correction based on the difference (414). This error correct affects control of the vent/charge cycle (e.g., at 408). For example, the error correction may modify predictive map 210 such that when the combination of inputs is received again, the error correction is applied. As another example, the error correction may be used to generate a second map (e.g., an error correction map, etc.) to corresponding with the inputs to predictive map 210 such that the output of the error correction map for the sensor inputs is applied to the output of predictive map 210 at those sensor inputs. As another examples, the error correction may be generally applied to the output of the predictive map (i.e., when the error correction represents a general degradation of the performance of oxygen concentrator 102). Concentrator controller 126 continues the slow feedback control loop (410).

In one or more examples, the concentrator controller 106 described herein may utilize hardware, software, firmware, or any combination thereof for achieving the functions described. Those functions implemented in software may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure.

Instructions may be executed by one or more processors within the accelerometer or communicatively coupled to the accelerometer. The one or more processors may, for example, include one or more DSPs, general purpose microprocessors, application specific integrated circuits ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for performing the techniques described herein. Also, the techniques could be fully implemented in one or more circuits or logic elements.

The techniques of this disclosure may be implemented in a wide variety of devices or apparatuses that include integrated circuits (ICs) or sets of ICs (e.g., chip sets). Various components, modules, or units are described in this disclosure to emphasize functional aspects of devices configured to perform the disclosed techniques, but do not necessarily require realization by different hardware units. Rather, various units may be combined or provided by a collection of interoperative hardware units, including one or more processors as described above, in conjunction with suitable software and/or firmware.

Various examples have been described. These and other examples are within the scope of the following claims.

What is claimed is:

1. An on-board oxygen generating system comprising:
   a concentrator comprising at least two beds, each bed comprising a valve to pneumatically couple the bed between a supply gas source and a vent; and
   control circuitry configured to:
   receive at least one input signal from at least one sensor aboard an aircraft;
   receive at least one measurement signal from an oxygen sensor, wherein the at least one measurement signal indicates an actual oxygen concentration of a product gas from the at least two beds;
   determine, using open loop control, a predicted oxygen concentration of the product gas from the at least two beds based on the at least one input signal;
   determine an error correction factor based on a difference between the predicted oxygen concentration and the actual oxygen concentration indicated by the at least one measurement signal; and
   control the valves of the at least two beds based on the predicted oxygen concentration and the error correction factor to adjust charge/vent ratios of the at least two beds.

2. The system of claim 1, wherein the at least one input signal from the at least one sensor aboard the aircraft comprises at least one of:
   a signal indicative of an input pressure of a supply gas into the at least two beds;
   a signal indicative of an ambient pressure;
   a signal indicative of a cabin pressure of the aircraft;
   a signal indicative of a temperature of the supply gas;
   a signal indicative of a flow rate of the product gas; or
   a signal indicative of an ascent/descent rate of the aircraft.

3. The system of claim 1, wherein the at least one input signal includes a signal indicative of an input pressure of a supply gas into the at least two beds, a signal indicative of an ambient pressure, a signal indicative of a cabin pressure of the aircraft, a signal indicative of a temperature of the supply gas, and a signal indicative of a flow rate of the product gas.

4. The system of claim 1, wherein the control circuitry is configured to determine the predicted oxygen concentration based on a multi-dimensional predictive control map.

5. The system of claim 4, wherein the at least one input signal comprises at least two input signals, and wherein the multi-dimensional predictive control map includes a mapping of the at least two input signals over an operational range of the on-board oxygen generating system to the oxygen concentration based on the charge/vent ratios.

6. The system of claim 4, wherein the multi-dimensional predictive control map maps a signal indicative of an input pressure of a supply gas into the at least two beds, a signal indicative of an ambient pressure, a signal indicative of a cabin pressure of the aircraft, a signal indicative of a temperature of the supply gas, and a signal indicative of a flow rate of the product gas to the oxygen concentration based on the charge/vent ratios.

7. The system of claim 1, further including the oxygen sensor, wherein the oxygen sensor is configured to measure the actual oxygen concentration of the product gas between a plenum and an oxygen regulator.

8. The system of claim 1,
wherein the control circuitry is first control circuitry, and
wherein the system further comprises second control circuitry configured to:
determine, based on feedback control, the error correction factor between the predicted oxygen concentration and the actual oxygen concentration measured by the oxygen sensor; and
in response to the first control circuitry being disabled, control the valves of the at least two beds.

9. A method to control an on-board oxygen generating system, the method comprising:
receiving at least one input signal from at least one sensor aboard an aircraft;
receiving at least one measurement signal from an oxygen sensor, wherein the at least one measurement signal represents an actual oxygen concentration of a product gas from at least two beds of a concentrator;
determining, using open loop control, a predicted oxygen concentration of the product gas from the at least two beds based on the at least one input signal, each of the at least two beds having a valve to pneumatically couple the bed between a supply gas source and a vent;
determining an error correction factor based on a difference between the predicted oxygen concentration and the actual oxygen concentration; and
sending one or more control signals to control the valves of the at least two beds based on the predicted oxygen concentration and the error correction factor to adjust charge/vent ratios of the at least two beds.

10. The method of claim 9, wherein input signals from the sensors aboard the aircraft comprise at least one of:
a signal indicative of an input pressure of a supply gas into the at least two beds;
a signal indicative of an ambient pressure;
a signal indicative of a cabin pressure of the aircraft;
a signal indicative of a temperature of the supply gas; or
a signal indicative of a flow rate of the product gas.

11. The method of claim 9, wherein determining the predicted oxygen concentration comprises performing a lookup on a multi-dimensional predictive control map.

12. The method of claim 11, wherein the at least one input signal comprises at least two input signals, and wherein the multi-dimensional predictive control map includes a mapping of the at least two input signals over an operational range of the on-board oxygen generating system to the oxygen concentration based on the charge/vent ratios.

13. The method of claim 11, wherein the multi-dimensional predictive control map maps a signal indicative of an input pressure of a supply gas into the at least two beds, a signal indicative of an ambient pressure, a signal indicative of a cabin pressure of the aircraft, a signal indicative of a temperature of the supply gas, and a signal indicative of a flow rate of the product gas to the oxygen concentration based on the charge/vent ratios.

14. A controller for an on-board oxygen generating system, the controller comprising:
a valve control circuit configured to operate valves of at least two beds of a concentrator, each of the valves configured to pneumatically couple the corresponding bed between a supply gas source and a vent; and
control circuitry configured to:
receive at least one input signal from at least one sensor aboard an aircraft;
receive at least one measurement signal from an oxygen sensor, wherein the at least one measurement signal represents an actual oxygen concentration of a product gas from the at least two beds;
determine, using open loop control, a predicted oxygen concentration of the product gas from the at least two beds based on the at least one input signal;
determine an error correction factor based on a difference between the predicted oxygen concentration and the actual oxygen concentration; and
control, via the valve control circuit, the valves of the at least two beds based on the predicted oxygen concentration and the error correction factor to adjust charge/vent ratios of the at least two beds.

15. The controller of claim 14, wherein the at least one input signal from the at least one sensor aboard the aircraft comprise at least one of:
a signal indicative of an input pressure of a supply gas into the at least two beds;
a signal indicative of an ambient pressure;
a signal indicative of a cabin pressure of the aircraft;
a signal indicative of a temperature of the supply gas; or
a signal indicative of a flow rate of the product gas.

16. The controller of claim 14, further comprising a non-volatile memory configured to store a multi-dimensional predictive control map, and wherein to determine the predicted oxygen concentration, the control circuitry is configured to perform a lookup on a multi-dimensional predictive control map.

* * * * *